United States Patent [19]

Okauchi et al.

[11] Patent Number: 4,843,501
[45] Date of Patent: Jun. 27, 1989

[54] DISC HANDLING APPARATUS

[75] Inventors: Shigeki Okauchi, Tokyo; Masaya Maeda, Kanagawa, both of Japan

[73] Assignee: Canon Kabushiki Kaisha, Tokyo, Japan

[21] Appl. No.: 88,978

[22] Filed: Aug. 21, 1987

Related U.S. Application Data

[63] Continuation of Ser. No. 554,838, Nov. 23, 1983, abandoned.

[30] Foreign Application Priority Data

Nov. 25, 1982 [JP] Japan .................. 57-206362

[51] Int. Cl.⁴ .......................................... G11B 5/016
[52] U.S. Cl. ................................................ 360/99.06
[58] Field of Search ............... 360/71, 74.1, 86, 97, 360/99; 369/77.1, 77.2, 258, 261, 262, 268

[56] References Cited

U.S. PATENT DOCUMENTS

| | | | |
|---|---|---|---|
| 3,803,351 | 4/1974 | Pedersen et al. | 369/268 X |
| 3,959,823 | 5/1976 | Heidecker et al. | 360/99 |
| 4,135,721 | 1/1979 | Camerik | 369/268 X |
| 4,476,556 | 10/1984 | Nagami et al. | 369/258 |
| 4,482,993 | 11/1984 | Agostini | 369/263 |
| 4,511,944 | 4/1985 | Saito | 360/133 |

FOREIGN PATENT DOCUMENTS

| | | | |
|---|---|---|---|
| 52-71203 | 6/1976 | Japan | 369/77.2 |
| 52-55316 | 5/1977 | Japan | 360/74.1 |
| 58-188362 | 11/1983 | Japan | 369/258 |
| 59-60758 | 4/1984 | Japan | 369/258 |

Primary Examiner—John H. Wolff
Attorney, Agent, or Firm—Toren, McGeady & Associates

[57] ABSTRACT

A disc handling apparatus having a motor for rotating a disc for signal recordation and/or reproduction including a device for insuring that the ejection of the disc from a recording and/or reproducing position is enabled after the rotation of the disc by the motor is stopped by a brake.

33 Claims, 4 Drawing Sheets

DISC HANDLING APPARATUS

This is a continuation of application Ser. No. 554,838, filed Nov. 23, 1983 now abandoned.

BACKGROUND OF THE INVENTION

1. Field of the Invention

This invention relates to a disc handling apparatus such as a recording or reproducing apparatus of the kind using a disc-shaped recording medium.

2. Description of the Prior Art

A recording or reproducing apparatus of the above-stated kind, such as a magnetic recording or reproducing apparatus using a magnetic disc as a recording medium, produces a queer sound and tends to have a driving motor, the magnetic disc, a recording or reproducing head and other parts damaged when an attempt is made to take out the magnetic disc while the magnetic disc driving motor is in operation. Generally, therefore, the disc handling apparatus of this kind is arranged either to prohibit any ejecting operation for taking out the disc before power supply to the disc driving motor is cut off by cessation of a recording or reproducing operation or to have the power supply to the disc driving motor cut off by an ejecting operation performed for taking out the disc. However, the motor does not immediately come to a stop after the power supply is cut off. It is apparent that the motor keeps on rotating for a certain period of time due to inertia after the end of power supply. Therefore, despite such arrangement, a hazard remains when an attempt is made to take out the disc during the inertial rotation of the motor.

SUMMARY OF THE INVENTION

It is therefore a principal object of the present invention to provide a disc handling apparatus which is capable of obviating the above-stated inconvenience of the prior art arrangement. More specifically, it is an object or the invention to provide a disc handling apparatus wherein the disc is arranged to be ejectable after the motor completely comes to a stop even when an ejecting operation is performed for taking out the disc while the disc driving motor is still rotating.

Another object of the invention is to provide a disc handling apparatus wherein the above-stated motor stopping and disc ejecting actions are arranged to be automatically carried out in a sequential manner in response to an ejecting operation.

To attain the object, a preferred embodiment of the invention representing an aspect thereof comprises: ejecting operation means; stopping means which stops a disc driving motor from rotating in response to the operation of the ejecting operation means; and actuating means for causing the disc to be ejected in response to the operation of the ejecting operation means after completion of the operation of the stopping means.

A further object of the invention is to provide a disc handling apparatus which permits disc ejection after confirmation of cessation of the rotation of a disc driving motor.

To attain this object, a preferred embodiment of the invention representing an aspect thereof comprises: ejecting operation means; stopping means which stops a disc driving motor from rotating in response to the operation of the ejecting operation means; detecting means for detecting cessation of rotation of the motor; and means for causing the disc to be ejected in response to the output of the detecting means.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
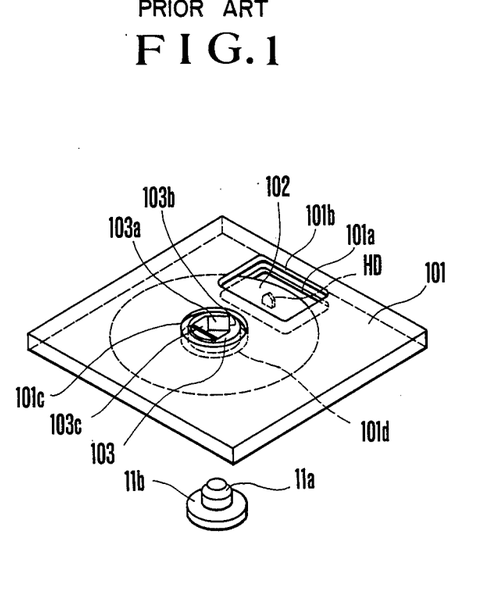
FIG. 1 is an oblique view showing a magnetic disc cassette which contains a magnetic disc therein as a recording medium, a rotating spindle and a magnetic head which are arranged on the side of a disc handling apparatus.

Referring to FIG. 1, a magnetic disc cassette usable in an apparatus according to the present invention is arranged with a magnetic disc cassette 101 which rotatably contains therein a magnetic disc 102 which serves as a recording medium. In the central part of the magnetic disc 102 is disposed a center core 103 which is formed with a synthetic resin or the like fixedly attached to the disc 102. The cassette 101 is provided with openings 101a and 101b in the upper and lower sides. A recording or reproducing magnetic head HD is allowed to have access to the disc 102 through these openings 101a and 101b when the cassette 101 is mounted on a loading station provided within the apparatus for recording or reproduction. The head HD is arranged to be shiftable by suitable means which is not shown in the radial directions of the magnetic disc 102 within the openings 101a and 101b. A spindle 11a is arranged, on which the center core 103 of the disc 102 is mounted, to be rotated as a rotative driving part by a disc rotating motor which will be described hereinafter. The spindle 11a is provided with a flange part 11b and is arranged to define the height of the disc 102 relative to the head HD with the lower side face of the center core 103 abutting on the upper end face of the flange part 11b. The connection part 103a of the center core 103 which is arranged to couple the core 103 with the spindle 11a consists of two slanting face parts 103b and a spring part 103c. When the cassette 101 is mounted on the loading station of the apparatus, the spring part 103c engages the slanting face parts 103b of the center core 103 with the spindle 11a and thus allows the disc 102 to rotate together with the spindle 11a for recording or reproduction of a signal through the head HD. The cassette 101 is further provided with other openings 101c and 101d which are respectively formed on the upper and lower sides of the cassette in places corresponding to the center core 103 respectively.

Figure 2:
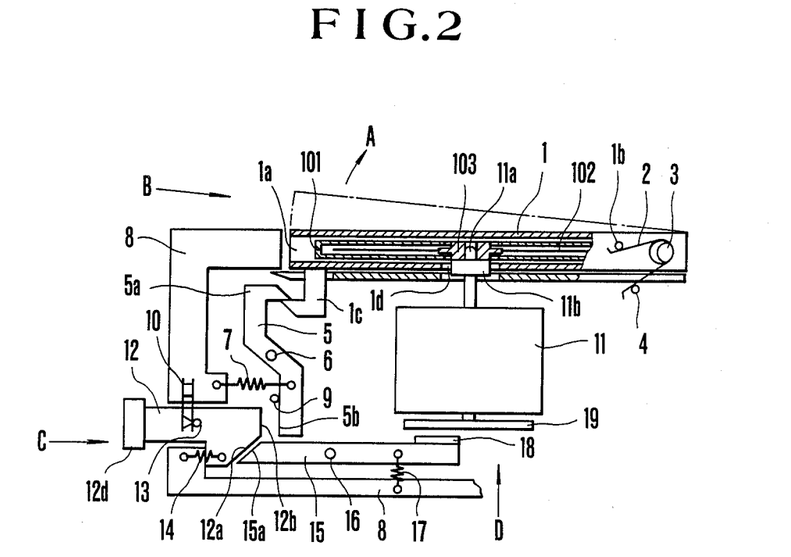
FIG. 2 is a side view showing a disc handling apparatus as a first embodiment of the present invention and particularly the mechanical arrangement of the essential parts thereof arranged according to the invention to handle the cassette shown in FIG. 1.

A first embodiment of the invention which uses the magnetic disc cassette 101 shown in FIG. 1 is arranged as shown in FIG. 2. The apparatus includes a lid 1 for the main body thereof. The lid 1 is provided with a cassette loading chamber 1a. The lid 1 is urged to turn in the direction of an arrow A shown in the drawing by a spring 2 which is disposed between a pin 1b provided on one side of the lid 1 and another pin 4 fixed to the main body. The lid 1 is thus arranged to turn on a shaft 3. A hook 1c is formed on a portion of the lid 1. A stopper 5 is arranged to be engageable with the hook 1c. The disc cassette 101 can be inserted into the loading chamber 1a from the direction of an arrow B by bringing the lid 1 into an open state as indicated by a one-dot-chain line. With the cassette 101 inserted, when the lid 1 is closed, the hook 1c engages with an engaging end 5a of the stopper 5 to keep the lid 1 in a closed state. In this condition, the cassette 101 is loaded on the loading station 8a for a recording or reproducing operation with the above-stated spindle 11a engaged with the center core 103 of the disc 102 contained in the cassette 101 through an opening 1d provided in the lower side of the lid 1. Meanwhile, the head HD (see FIG. 1) comes to confront the disc 102 from below. The stopper 5 is arranged to turn on a shaft 6. There is provided a spring 7 which has one end thereof secured to the stopper 5 and the other end to a part of the main body 8. The stopper 5 is thus urged by the spring 7 to turn clockwise and is prevented from disengaging the hook 1c due to an external shock or vibration. The turning movement of the stopper 5 is limited by a pin 9. Power supply to a disc driving motor 11 is controlled by a normally open type switch 10. The apparatus further includes an eject lever 12; a pin 13 erected on the eject lever 12; and a spring 14 which is arranged to urge the eject lever 12 to move toward the outside of the main body 8. Under the illustrated condition, the switch 10 is closed with one of the contacts thereof pushed by the pin 13. However, when the eject lever 12 is operated in the direction of an arrow C shown against the force of the spring 14, the switch 10 opens its contacts by itself. A brake lever 15 is arranged to turn on a shaft 16. A spring 17 is interposed between the brake lever 15 and the main body 8 and is arranged to urge the brake lever 15 to move in a direction opposite to the direction of an arrow D shown. A brake pad 18 which is made of a soft rubber or the like and is attached to an end portion of the brake lever 15 is normally separated by the urging force of the spring 17 from a rotary wheel 19 which is attached to the tail end of the rotating shaft of the motor 11. The opposed parts of the eject lever 12 and the brake lever 15 are respectively formed into slanting faces 12a and 15a.

Further, in this embodiment, the spindle 11a is directly formed at the top end of the rotating shaft of the motor 11.

The apparatus which is arranged as shown in FIG. 2 operates such that when the eject lever 12 is pushed in the direction C via an operation knob 12d attached to the lever 12, the contacts of the switch 10 open to cut off power supply to the motor 11. Following this, the slanting face 12a of the eject lever 12 comes to abut on the slanting face 15a of the brake lever 15 to cause the brake lever 15 to turn counterclockwise against the force of the spring 17 as viewed on the drawings. The brake pad 18 moves in the direction D to come into contact with the rotary wheel 19. Braking is thus applied to the rotating shaft of the motor 11, i.e. the spindle 11a, to bring the motor 11 to stop. When the eject lever 12 is further pushed in the direction C, the fore end 12b of the lever 12 comes to abut on the lower end 5b of the stopper 5. This causes the stopper 5 to turn counterclockwise against the force of the spring 7 and thus disengages the engaging part 5a thereof from the hook 1c. This disengagement allows the lid 1 to be turned by the spring 2 in the direction A. The lid 1 thus opens as shown by the one-dot-chain line in FIG. 2 to permit the cassette 101 to be taken out. In the apparatus of FIG. 2, as will be understood from the above description, the ejecting arrangement is allowed to operated after the motor 11 comes to stop even when an ejecting operation is inadvertently performed on the eject lever 12 during rotation of the motor 11. Therefore, the apparatus thus precludes the possibility of any accident such as that previously mentioned herein. Besides, the above-stated actions are arranged to be automatically carried out in succession in response to the ejecting operation performed only once on the eject lever 12.

Figure 3:
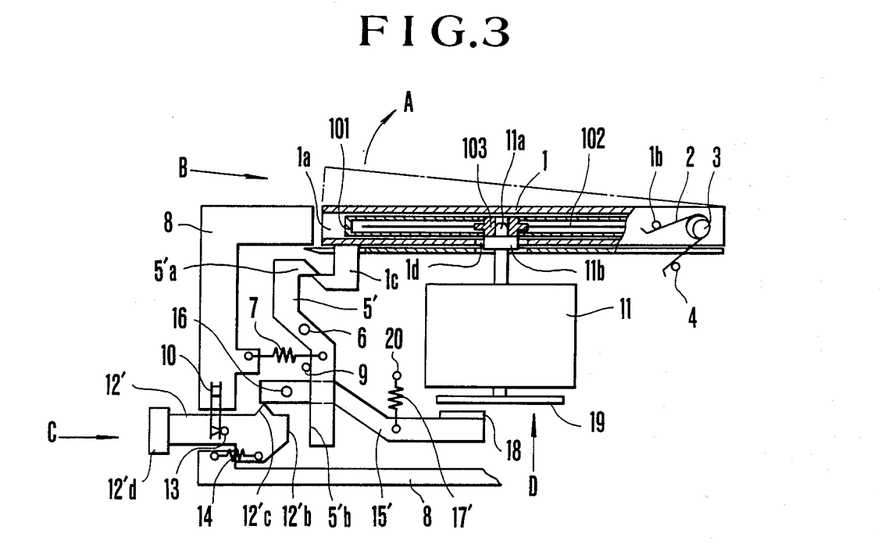
FIG. 3 is a side view showing a disc handling apparatus as a second embodiment of the present invention and particularly the mechanical structural arrangement of the essential parts thereof arranged according to the invention to handle the cassette shown in FIG. 1.

A second embodiment of the invention is arranged as shown in FIG. 3. The apparatus of FIG. 3 is an improvement over that of FIG. 2. The point of improvement resides in that the pressing force of the brake pad on the rotary wheel connected to the rotating shaft of the motor is arranged to be readily adjustable. In FIG. 3, the members indicated by the same reference numerals as those used in FIG. 2 are basically of the same arrangement and functions while those indicated by the same reference numerals primed are arranged to be of somewhat different shapes though their functions are basically the same as those shown in FIG. 2.

Referring to FIG. 3, the switch 10 has its contacts opened when the eject lever 12' is pushed in the direction C via the operation knob 12'd. The switch 10 thus cuts off power supply to the motor 11. A protrudent part 12'c of the lever 12' moves also in the direction C. When the protrudent part 12'c passes by the turning shaft 16 of the brake lever 15', the spring 17' causes the lever 15 to turn counterclockwise. Then, the brake pad 18 is pushed against the rotary wheel 19 by virtue of the force of the spring 17' to apply the brake to the spindle 11a of the motor 11. The brake brings the motor 11 to stop. After, that, the fore end 12'b of the eject lever 12' comes to abut on the lower end 5'b of the stopper 5' to turn the stopper 5' counterclockwise. As a result, the engaging part 5'a of the stopper 5' disengages from the hook 1c to open the lid 1, so that the cassette 101 can be taken out.

In this case, if the position of the pin 20 engaging the spring 17' which urges the brake lever 15' in the counterclockwise direction is arranged to be adjustable in upward and downward directions, for example, the pressing force of the brake pad 18 to be exerted on the rotary wheel 19 can be adjusted via adjustment of the strength of the spring 17' so that the motor 11 can be brought to stop always by an appropriate braking force.

Figure 4:
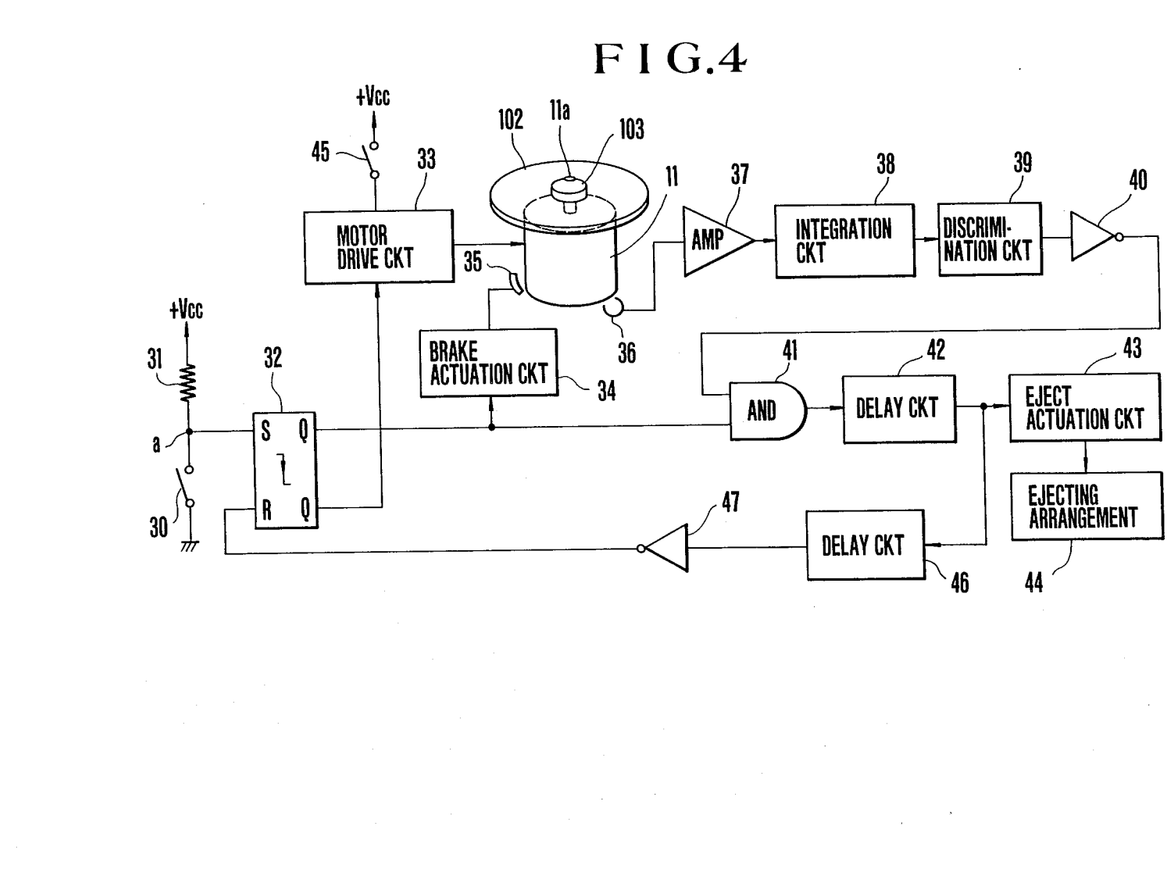
FIG. 4 is a circuit block diagram showing a disc handling apparatus as a third embodiment of the present invention and particularly the electrical arrangement of the essential parts relative to the present invention.

A third embodiment of the invention is shown in FIG. 4. In this case, the control described in the foregoing is carried out through an electrical arrangement. The embodiment includes means for detecting stopping of the motor and the ejecting arrangement is operated in response to the output of this detecting means. The apparatus of FIG. 4 includes an eject switch 30. When this switch 30 is turned on, the potential at a connection point "a" between the switch 30 and a resistor 31 changes from a high level to a low level. This change sets a fall-synchronizing type RS flip-flop 32 to make the level of the output Q thereof high and that of the output $\overline{Q}$ low. When the level of the output $\overline{Q}$ of the flip-flop 32 becomes low, a motor drive circuit 33 cuts off power supply to a disc motor 11 even while a motor start switch 45 is on. On the other hand, when the level of the output Q of the flip-flop 32 becomes high, a brake actuation circuit 34 causes braking means 35 to operate on the motor 11. The spindle 11a is thus stopped from rotating. In this instance, the brake means 35 may be arranged, for example, to include the brake lever 15 or 15' having the brake pad 18 as shown in FIGS. 2 and 3 and an electromagnet or the like for controlling the brake lever 15 or 15'. The brake actuation circuit 34 is arranged to energize the electromagnet to swing the brake lever 15 or 15', by thus bringing the brake pad 18 into pressing contact with the rotary wheel 19, so that the spindle 11a can be stopped from rotating. In the case of the structural arrangement shown in FIG. 3, for example, the electromagnet is to be arranged to attract the brake lever 15' against the force of the spring 17' when no current is supplied thereto and to release it when a current is supplied thereto.

The rotation of the rotor of the motor 11 is detected by a rotation detecting sensor 36 (which is, for example, a magnetic-sensitive element). The pulse output of the sensor 36 is supplied to a discrimination circuit 39 via an integration circuit 38. The circuit 39 then determines whether or not the rotation of the rotor of the motor 11 has been brought to stop. More specifically, the circuit 39 is composed of a comparison circuit and is arranged to produce a low level signal therefrom when the output level of the integration circuit 38 virtually becomes zero. The output of the discrimination circuit 39 is inverted by an inverter 40 and, after that, is supplied to an AND gate 41 together with the output Q of the flip-flop 32. In this instance, when the rotor of the motor 11, i.e. the spindle 11a completely comes to a stop, the output level of the AND gate 41 becomes high. The high level output of the AND gate 41 is supplied to an eject actuation circuit 43 via a delay circuit 42. The delay circuit 42 is arranged to provide a necessary length of time delay between cessation of the rotation of the spindle 11a and commencement of the operation of an ejecting arrangement 44. However, this delay circuit 42 may be dispensed with if the circuit disposed at a preceding stage gives a sufficient length of such time delay. The eject actuation circuit 43 is arranged to perform control over the ejecting action on the cassette 101 and, for example, includes a monostable multivibrator. The circuit 43 allows the ejecting arrangement 44 to operate only for a period of time set at the monostable multivibrator. Further, in this instance, the ejecting arrangement 44 includes, for example, the stopper 5 or 5' shown in FIGS. 2 and 3, an electromagnet for controlling the stopper 5 or 5'. In response to a high level output of the delay circuit 42, the eject actuation circuit 43 supplies a current to the electromagnet to cause the stopper 5 or 5' to turn counterclockwise against the force of the spring 7, so that the hook part 1c of the lid 1 can be unlocked.

The output of the delay circuit 42 is further delayed for a short length of time by another delay circuit 46. The output of the delay circuit 46 is inverted by an inverter 47 and then is supplied to the reset input terminal of the flip-flop 32. The flip-flop 32 is reset by a change of the output level of the inverter 47 from a high level to a low level. With the flip-flop 32 thus reset, the level of the output Q comes back to a low level and that of the output $\overline{Q}$ to a high level.

The disc handling apparatus according to the present invention, as has been described in detail, is arranged to have the recording disc actually ejected only after the disc driving motor is completely stopped from rotating even when an ejecting operation is inadvertently performed while the motor is still rotating. The invented arrangement, therefore, obviates the possibility of such accidents that the apparatus emits a queer sound and the recording medium or disc, the driving motor, the recording or reproducing head and other parts of the apparatus are damaged when an attempt is made to take out the disc during the rotation of the motor.

It is another advantage of the invention that a series of processes between the cessation of power supply to the motor and the actual ejection of the disc can be automatically carried out in response to the ejecting operation performed only once.

The mechanical arrangement of the brake means which is shown in FIG. 4 may be replaced with some electrical brake arrangement such as a circuit arranged to apply the brake by short-circuiting the two ends of the motor in response to the output of the brake actuation circuit 34. The same modification is applicable also to other embodiments shown in FIGS. 2 and 3. Further, as an example of modification of the embodiment shown in FIG. 4, the elements 36-41 may be omitted in cases where the delay circuit 42 can be arranged to ensure that the ejecting arrangement 44 is actuated after the spindle 11a of the motor 11 is brought to stop by the brake means 35 and not before.

While all the embodiments described are arranged to handle a magnetic disc, the invention is not limited to such arrangement but is applicable also to other apparatuses handling different types of recording discs including an optical type disc, an electrostatic capacity type disc, etc. irrespective of whether these discs are contained in containers such as a cassette.

In addition to the arrangement having brake means and ejecting means operated in due succession, the invention is also applicable to an apparatus arranged to have the disc automatically ejected in cases where some disorder or trouble occurs during a recording or reproducing operation.

What we claim is:

1. An apparatus for handling a disc, comprising:
(A) a loading station for loading thereon said disc;
(B) rotating means for rotating said disc, said rotating means being coupled with said disc when the disc is loaded on said station, and being arranged to generate pulses corresponding to the rotation caused by said rotating means;
(C) ejecting means for ejecting said disc from said station;
(D) brake means for braking said rotating means to stop the rotation of said disc by said rotating means; and
(E) detecting means for detecting that the rotating means is stopped by said brake means, said detecting means producing a charcteristic output representing the stoppage of said disc, wherein said ejecting means operating after said characteristic output is produced and in response thereto, said detecting means being arranged to integrate signals corresponding to said pulses and to detect the stoppage.

2. The apparatus according to claim 1, wherein said operating means includes;

movable means movable to a predetermined first position and to a predetermined second position beyond the first position in succession;

first means for operating said brake means when said movable means is moved to said first position; and second means for operating said ejecting means when said movable means is moved to said second position.

3. The apparatus according to claim 2, wherein said operating means further includes manually operable means for moving said movable means to said first and second positions in succession.

4. The apparatus according to claim 2, wherein said rotating means includes an electrical motor and wherein the apparatus further comprises switch means arranged to interrupt the supply of electrical power to said motor when or before said movable means is moved to said first position.

5. The apparatus according to claim 1, further comprising manually operable means to operate said brake means.

6. The apparatus according to claim 1, wherein said rotating means includes an electrical motor and wherein the apparatus further comprises switch means arranged to interrupt the supply of electrical power to said motor when or before said brake means is operated by said first means.

7. The apparatus according to claim 1, wherein said rotating means includes an electrical motor and wherein the apparatus further comprises switch means arranged to interrupt the supply of electrical power to said motor when or before said brake means is operated by said first means.

8. The apparatus according to claim 1, wherein said rotating means includes an electrical motor and wherein the apparatus further comprises switch means arranged to interrupt the supply of electrical power to said motor when or before said brake means is operated by said operating means.

9. The apparatus according to claim 1, wherein said ejecting means includes:

receiving means for receiving therein said disc, said receiving means being movable between a first position for receiving therein the disc and a second position for loading the received disc on said station;

urging means for urging said receiving means toward said first position; and latching means for latching said receiving means at said second position against said urging means;

said operating means being arranged to release the latching of said receiving means at said second position by said latching means.

10. The apparatus according to claim 1, wherein said rotating means includes an electrical motor having a rotor and wherein said brake means includes mechanical means for braking said rotor by friction.

11. The apparatus according to claim 1, wherein said rotating means includes an electrical motor having a rotor and wherein said brake means includes an electrical means for electrically braking said rotor.

12. A recording and/or reproducing apparatus using a disc-shaped recording medium housed in a cassette, comprising:

(A) a loading station for loading thereon said cassette;

(B) rotating means for rotating said recording medium, said rotating means being coupled with the recording medium when the cassette is loaded on said station, and being arranged to generate pulses corresponding to the rotation caused by said rotating means;

(C) head means for recording signals on the recording medium and/or for reproducing recorded signals from the recording medium;

(D) ejecting means for ejecting said cassette from said station;

(E) brake means for braking said rotating means to stop the rotation of the disc by the rotating means;

(F) first operating means for operating said brake means;

(G) detecting means for detecting that the rotation of said medium by said rotating means is stopped by said brake means, said detecting means producing a characteristic output representing the stoppage of said medium, and being arranged to integrate signals corresponding to said pulses and to detect the stoppage; and (H) second operating means for operating said ejecting means after said characteristic output is produced.

13. The apparatus according to claim 12, further comprising:

movable means movable to a predetermined first position and to a predetermined second position beyond the first position; and manually operable means for moving said movable means to said first and second positions in succession, wherein said first operating means is arranged to operate said brake means when said movable means is moved to said first position and said second operating means is arranged to operate said ejecting means when said movable means is moved to said second position.

14. The apparatus according to claim 13, wherein said rotating means includes an electrical motor and wherein the apparatus further comprises switch means arranged to interrupt the supply of electrical power to said motor when or before said movable means is moved to said first position.

15. The apparatus according to claim 12, further comprising manually operable means, said first operating means being responsive to said manually operable means to operate said brake means.

16. The apparatus according to claim 12, wherein said rotating means includes an electrical motor and wherein the apparatus further comprises switch means arranged to interrupt the supply of electrical power to said motor when or before said brake means is operated by said first operating means.

17. The apparatus according to claim 12, wherein said ejecting means includes:

receiving means for receiving therein said cassette, said receiving means being movable between a first position for receiving therein the cassette and a second position for loading the received cassette on said station;

urging means for urging said receiving means toward said first position; and latching means for latching said receiving means at said second position against said urging means;

said second operating means being arranged to release the latching of said receiving means at said second position by said latching means.

18. The apparatus according to claim 12, wherein said rotating means includes an electrical motor having a rotor
and wherein said brake means includes mechanical means for braking said rotor by friction.

19. The apparatus according to claim 12, wherein said rotating means includes an electrical motor having a rotor
and wherein said brake means includes electrical means for electrically braking said motor.

20. A recording and/or reproducing apparatus using a disc-shaped recording medium housed in a cassette, comprising:
(A) a loading station for loading thereon said cassette;
(B) rotating means for rotating said recording medium, said recording means being coupled with the recording medium when the cassette is loaded on said station, and being arranged to generate pulses corresponding to the rotation caused by said rotating means;
(C) head means for recording signals on the recording medium and/or reproducing recorded signals from the recording medium;
(D) ejecting means for ejecting said disc from said station;
(E) brake means for braking said rotating means to stop the rotation of the disc by the rotating means;
(F) first operating means for operating said brake means;
(G) detecting means for detecting that the rotation of the disc by said rotating means is stopped by said brake means, said detecting means producing a characteristic output when detecting the stoppage of the rotation of the disc, and being arranged to integrate signals corresponding to said pulses and to detect the stoppage; and
(H) second operating means responsive to said characteristic output of said detecting means for operating said ejecting means.

21. The apparatus according to claim 20, further comprising
manually operable means,
said first operating means being responsive to said manually operable means to operate said brake means.

22. The apparatus according to claim 20, wherein said rotating means includes an electrical motor
and wherein the apparatus further comprises
switch means arranged to interrupt the supply of electrical power to said motor when or before said brake means is operated by said operating first means.

23. The apparatus according to claim 20, wherein said ejecting means includes:
receiving means for receiving therein said cassette, said receiving means being movable between a first position for receiving therein the cassette and a second position for loading the received cassette on said station;
urging means for urging said receiving means toward said first position; and
latching means for latching said receiving means at said second position against said urging means;

said second operating means being arranged to release the latching of said receiving means at said second position by said latching means.

24. The apparatus according to claim 20, wherein said rotating means includes an electrical motor having a rotor
and wherein said brake means includes mechanical means for braking said rotor by friction.

25. The apparatus according to claim 20, wherein said rotating means includes an electrical motor having a rotor
and wherein said brake means includes electrical means for electrically braking said rotor.

26. A recording and/or reproducing apparatus using a disc-shaped recording medium housed in a cassette, comprising:
(A) receiving means for receiving therein said cassette, said receiving means being movable between a first position for receiving therein the cassette and a second position for placing the received cassette at a predetermined recording and/or reproducing position;
(B) urging means for urging said receiving means toward said first position;
(C) latching means for latching said receiving means at said second position against said urging means;
(D) rotating means for rotating said disc, said rotating means being coupled with the disc when the cassette is placed at said recording and/or reproducing position by said receiving means, and being arranged to generate pulses corresponding to the rotation caused by said rotating means;
(E) brake means for braking said rotating means to stop the rotation of the disc by the rotating means;
(F) release means for releasing the latching of said receiving means by said latching means;
(G) detecting means for detecting that the rotation of the disc by said rotating means is stopped by said brake means, said detecting means producing a characteristic output representing the stoppage of said disc, and being arranged to integrate signals corresponding to said pulses and to detect the stoppage; and
(H) control means for operating said release means after said characteristic output is produced.

27. The apparatus according to claim 26, wherein said rotating means includes an electrical motor
and wherein the apparatus further comprises
switch means arranged to interrupt the supply of electrical power to said motor when or before said brake means is operated by said control means.

28. An apparatus comprising:
(A) a loading station for loading thereon a disc;
(B) rotating means for rotating said disc, said rotating means being couplable with the disc when the disc is loaded on said rotation;
(C) means for generating pulses corresponding to the rotation caused by said rotating means;
(D) brake means for braking said rotation to stop the rotation of said disc by said rotating means;
(E) means for integrating signals corresponding to said pulses and for detecting that the rotation substantially stops based on the integrated value of said signals, said integrating and detecting means outputting a representing signal when said rotation substantially stops; and
(F) ejecting means for ejecting said disc from said station in response to said representing signal.

29. An apparatus according to claim 28, wherein said rotating means includes:
(A) a motor;
(B) a spindle being couplable with the disc when the disc is loaded on said station, said spindle is rotated by said motor.

30. An apparatus according to claim 28, wherein said brake means includes:
a braking member for stopping the rotation of said motor when brought in contact with said motor.

31. An apparatus comprising:
(A) a loading station for loading thereon a disc;
(B) rotating means for rotating said disc, said rotating means being couplable with the disc when the disc is loaded on said station;
(C) means for generating pulses corresponding to the rotation caused by said rotating means;
(D) means for ejecting said disc from said station;
(E) means for causing said ejecting means to eject said disc from said station;
(F) brake means for braking said rotation to stop the rotation of said disc by said rotating means;
(G) means for integrating signals corresponding to said pulses and for detecting that the rotation substantially stops based on the integrated value of said signals, said integrating an detecting means outputting a representing signal when said rotation substantially stops; and
(H) means for prohibiting ejecting operation of said ejecting means until said representing signal is outputted by said integrating and detecting means.

32. An apparatus according to claim 31, wherein said brake means includes:
a braking member for stopping the rotation of said motor when brought in contact with said motor.

33. An apparatus according to claim 31, wherein said brake means stops said rotation in response to said causing means causing said ejecting means to eject said disc.

* * * * *